April 24, 1956

L. E. GARONO ET AL 2,743,265

GELATIN EXTRACTION PROCESS

Filed Sept. 17, 1953

INVENTORS
Louis E. Garono
Franklin Kramer
Albert E. Steigmann

BY Cameron, Kerkam & Sutton
ATTORNEYS

April 24, 1956 L. E. GARONO ET AL 2,743,265
GELATIN EXTRACTION PROCESS
Filed Sept. 17, 1953 2 Sheets-Sheet 2
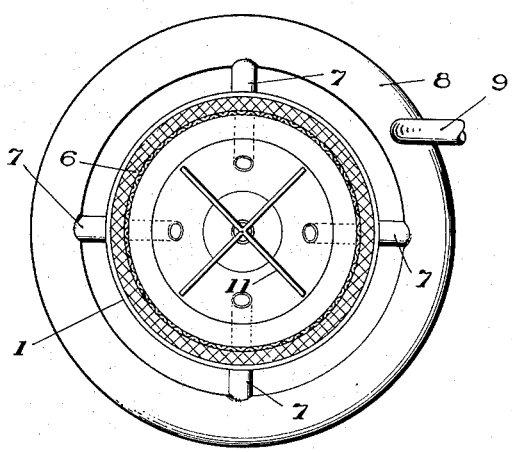
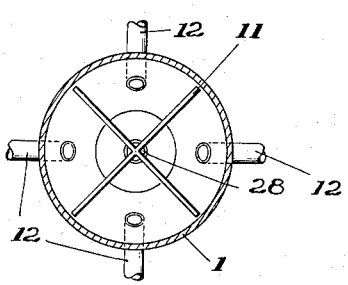
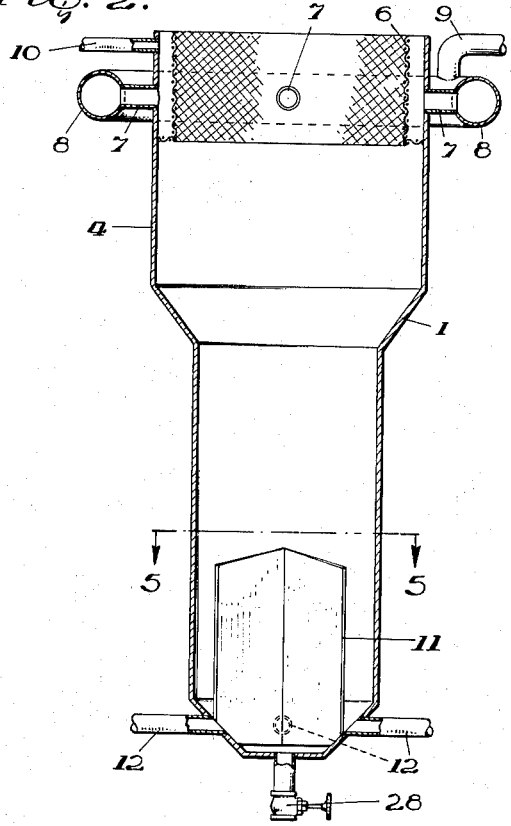
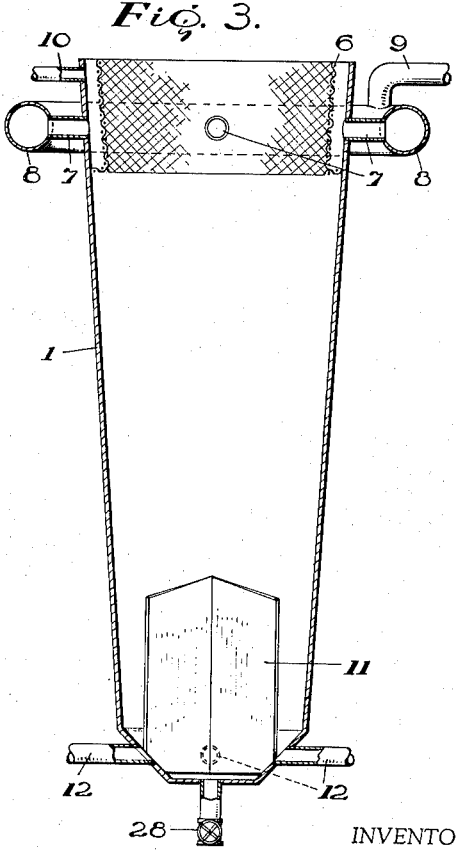
INVENTORS
*Louis E. Garono*
*Franklin Kramer*
*Albert E. Steigmann*
BY
*Cameron, Kerkam & Sutton*
ATTORNEYS

United States Patent Office 2,743,265
Patented Apr. 24, 1956

2,743,265
GELATIN EXTRACTION PROCESS

Louis E. Garono, Army Chemical Center, Md., Franklin Kramer, Forest Hills, N. Y., and Albert E. Steigmann, Stoneham, Mass., assignors to General Foods Corporation, New York, N. Y., a corporation of Delaware Application September 17, 1953, Serial No. 380,726

6 Claims. (Cl. 260—118)

This invention relates to a method for the extraction of gelatin from collagen-bearing materials, and particularly to a continuous process wherein a clear product of greatly increased bloom and high viscosity can be obtained.

The extraction of gelatin from collagen-bearing materials such as ossein and skins is almost universally performed in tanks with a steam coil under a perforated false bottom. The charge rests on the false bottom and thus does not directly contact the steam coil, whereas any liquid fills the entire tank and therefore is able to contact said steam coil. Water is introduced and maintained at 140° F. The first extract is drawn off after from 5 to 8 hours, the stock being retained on the false bottom. The temperature is raised to 150° F. and a second extraction is made. Several further runs are made, usually not over six, and the maximum temperature reached is about 212° F. The pH of the extracted liquor always remains between 6 and 7. The last extracts are dark, and the gelatin prepared therefrom has a low gel strength. After extraction, the gelatin liquor is filtered, concentrated, refiltered, gelled, cut into pieces, dried in a tunnel drier to 10% moisture and ground to powder.

The value of any finished gelatin is determined by its physical properties, principally bloom and viscosity. The bloom as used herein is defined as the weight in grams required to impress a one-half inch diameter plunger 4 mm. into a gelatin solution containing 6% solids gelled at 10° C. for 17 hours. The viscosity as used herein is defined as the viscosity in millipoises of a 6% solution at 40° or 60° C.

Inherent disadvantages in the usual extraction process result in the necessity of relying on empirical control in order to obtain a satisfactory product. An excessive holdup time allows hydrolysis of the gelatin to occur. Too short an extraction period lowers the overall plant capacity and efficiency. It is almost impossible to maintain any consistency in the quality of each extraction because of the lengthy holdup time and the batch nature of the process. Equipment must be large; for much of the time it is not in use. Heat transfer cannot be increased without agitation, and agitation causes the gelatin solution to become cloudy. The residue which remains in the kettles after cooking must be shoveled out by hand, which is a disagreeable and difficult job. The extracted gelatin solution, which is very heat-sensitive, surrounds the heating coils and if left in contact therewith for any length of time, considerable degradation takes place. The usual method above-described results in a considerable loss of bloom and viscosity.

Many attempts have been made to overcome these difficulties by means of a continuous process; however, none has proved commercially practical. Furthermore, it is known that the time required to extract hides and ossein can be materially reduced if the extraction is carried out under acidic conditions. This would suggest a method for reducing the required holdup time; however, it has always been believed that acidic extraction causes a secondary hydrolysis of gelatin to such an extent that it is not commercially feasible.

An object of the invention is to provide a gelatin of greatly increased bloom and having good clarity, high viscosity and the other characteristics of high grade gelatin.

Another object is to provide a process for the extraction of gelatin wherein the extracted gelatin will be of uniformly high quality throughout the entire extraction.

Another object is to provide a process for the extraction of gelatin whereby the period of time required for the extraction is materially reduced with a consequent reduction in the amount of degradation of extracted gelatin.

Still another object is to provide a process wherein only moderate extraction temperatures are required to extract substantially all of the gelatin from the stock with a consequent reduction in the rate of degradation of the extracted gelatin.

A still further object is to provide uniform heating in a process for the extraction of gelatin so that the gelatin degradation is minimized.

Still another object is to provide a continuous process for the extraction of gelatin and one which requires a minimum amount of attention while resulting in gelatin of uniform, high quality.

These and other objects of the invention will be apparent from the discussion that follows hereinafter.

It has now been discovered that gelatin of high quality can be provided by first acidifying the gelatin stock, as by soaking, so that the acid is uniformly distributed throughout the stock, and thereafter extracting the gelatin from the stock with hot water, the acidification of the stock being sufficient so that the pH of the extracted gelatin solution is within the range of about 1.5 to 3.5, preferably about 2.0 to 3.0, and adjusting the pH of the effluent gelating solution to at least about 4.0 to neutralize the degrading effect of the acid. By proceeding in this manner it is possible to shorten the period required for the extraction of the gelatin from the stock to a fraction of the time previously required and also to use only moderate temperatures of extraction, so that the extraction may be carried out in a continuous manner to provide gelatin of high quality and greatly increased bloom.

Although it is important that the pH of the extracted gelatin solution be adjusted to 4.0 or above in order to substantially halt degradation of the gelatin which occurs at the lower pHs, it is preferred for the most part that the pH be adjusted still higher, namely, to within a range of about 5.0 to 8.0, since this will serve to insure the termination of the degradation. However, gelatin extracted from pigskin is not as susceptible to degradation at lower pHs as is gelatin extracted from other types of gelatin stock so that it is usually adequate to adjust the pH of pigskin gelatin solutions to somewhat above 4.0.

Gelatin stock includes principally tanners stock, pigskin and ossein; however, any collagen-bearing material from which gelatin may be extracted including skins obtained from buffalo, camels and rabbits, and the like, may be employed.

Tanners stock, chiefly cattle skin as the name implies, is obtained from the leather manufacturer. The skins used for making gelatin are the hides and trimmings. The valuable collagen is found principally in the corium of the skin, but also in the connective tissue, tendons, etc. Before reaching the gelatin plant, tanners stock has been either dried, limed or pickled. Drying may be done in any conventional manner. Pickled skins have been soaked in sulfuric acid and brine. Limed skins have been soaked in a lime solution. Stock which has received this treatment comes in the form of "splits" or "pieces." Splits usually comprise the flat uniform portions of skin which have had the epidermis and flesh removed. Pieces consist of odd trimmings such as cheekings, bellies, etc., and are treated without cutting. Some of the pieces measure 3 or 4 feet in one direction.

Ossein is prepared from animal bones which are degreased, ground and treated with cold, dilute hydrochloric acid to dissolve the mineral matter in the bones such as calcium phosphate and carbonate. The organic matter which remains is commercial ossein.

Upon being received at the gelatin plant, both tanners stock and ossein are usually, although not necessarily, treated in a saturated lime solution for from 30 to 120 days depending upon the type of stock, the plant capacity, the visual appearance of the raw material, the temperature and whether or not additives such as sodium hydroxide are added. With proper liming, tanners stock becomes swollen and soft, while ossein swells and occasionally turns snow-white; the mucins and albumins are dissolved and most of the remaining grease is saponified. After liming, the lime solution is drained off and the stock is removed from the lime pits. The stock may be washed with water and then dilute hydrochloric acid and finally with water until the desired cooking pH is reached. Heretofore, this pH was such that the pH of the extracted gelatin solution in the extraction kettles was beween 6 and 7.

Pigskin stock, like pieces, is ordinarily processed in large pieces, and for all except special purposes does not receive any lime conditioning at the gelatin plant. This stock which is normally received in a frozen form is thawed, washed and adjusted to a cooking pH of between 4.0 and 4.5 with hydrochloric acid.

In practicing the present invention, it is preferred to degrease pigskin stock, a step not usually important with other gelatin stocks.

The process of the present invention is applied to gelatin stock of the type described above, and hereinafter in the claims the term "gelatin stock" refers to stock which has been preliminarily conditioned in the aforesaid manner or any equivalent thereof.

The acidification of the stock in accordance with the process of the present invention is best carried out by soaking the gelatin stock in an aqueous solution of a strong acid of such concentration and for such a period of time that upon subsequent extraction of the gelatin stock the extracted gelatin solution will have a pH within the range of about 1.5–3.5. Any strong acid such as HCl, $H_2SO_4$, $H_2SO_3$, $H_3PO_4$, $CH_3COOH$, and the like, may be used, hydrochloric acid being the most practical. Excellent results are obtained with a solution of hydrochloric acid having a pH of 1.0 or less in which case approximately 4–8 hours are required for the soaking necessary to provide the desired degree and uniformity of acidification of the stock. The pH of the acid solution in which the stock is soaked is sometimes herein referred to as the "soak pH" whereas the effluent pH or pH of the extracted gelatin solution being largely determined by the acid absorbed by the stock is sometimes referred to herein as the "stock pH."

Generally, a ratio of about 2 parts by weight of acidified water to 1 part by weight of gelatin stock is used to soak the stock and about 1 part by weight of HCl is absorbed by stock producing about 10 parts by weight of gelatin. Examples of the amounts of acid required in the soak water with different types of gelatin stock and the corresponding periods of time required for the soaking or acidification are set forth in the table below:

| Type of Stock | Lbs. of 20% HCl/lb. of Gelatin in Stock | Soaking Time (Hours) |
| --- | --- | --- |
| Limed Splits | 0.2–0.4 | 4–7 |
| Limed Pieces | 0.3–0.5 | 4–7 |
| Ossein | 0.2–0.4 | 4–7 |
| Pigskin | 0.25–0.35 | 5–8 |

The period of time required for the soaking necessary for the desired degree and uniformity of acidification is a function of the type and concentration of acid employed, the type and degree of subdivision of the stock and the temperature at which the soaking is carried out. Generally, the differences effected by the use of different acids is not very pronounced. For example, whether hydrochloric or sulfuric acid is used is of little importance from the standpoint of the acidification itself although, of course, handling problems are presented with the latter due to corrosion and the formation of insoluble salts. Of similar importance are the type and degree of subdivision of the gelatin stock. On the other hand, it is preferred that the soak pH be low, say, about 1.0 or below, in order to keep the time required as short as possible. For example, if it is desired that the stock pH be 3.0, the soak pH employed could be 3.0 or less. Use of a stock pH of 1.0 or below, however, would require less soaking time although time for washing the stock is required after soaking at such low soak pHs. It is preferred to use a soak pH at least 0.5 pH unit below the desired stock pH and wash the stock with fresh water to provide the desired stock pH, say, the aforementioned pH of 3.0. At the lower temperatures which may be employed for the acidification, say, 40° F., the acidification proceeds rather slowly, whereas at the higher temperatures, say, 100° F., the acidification proceeds more rapidly but there is some danger of extraction of the gelatin. Generally, extraction begins to occur at about 115° F. although in some cases this temperature may be as low as 100° F. For that reason it is well to stay below about 90° F. and, in fact, temperatures of soaking within the range of about 50°–75° F. are preferred.

Generally, the soaking period is followed by removal of the stock from the acid or, on the other hand, draining the acid away from the stock, and thereafter washing the stock by flushing water through it for a period of, say, 2–4 hours. In the case of limed stocks it is frequently advantageous, on the other hand, to soak for a period of, say, 4 hours, and thereafter wash the stock for, say, 3 hours, to wash out the calcium salts such as calcium chloride, and follow this by a second period of soaking which may be of the order of 4 hours, and which in turn is followed by a second washing period of about 1 hour to remove excess acid.

In order to determine the stock or effluent pH and thus whether or not the acidification of the gelatin stock is complete, small samples of the stock are removed from the soaking kettle and extracted with water at a temperature of about 150° F. until about 90% of the gelatin solids have been removed. The pH of this gelatin solution is determined and if found to be within the range of about 1.5 to 3.5 the stock is ready for extraction. Care should be taken to note the pH of the extract. Generally, the 90% extraction mentioned above requires about 2 hours. If the pH remains substantially constant after the first half hour of the period this indicates that the acid distribution within the stock is of satisfactory uniformity. On the other hand, if the pH rises as the extraction continues the indication is that there is a lacking uniformity of acid distribution within the stock.

Gelatin has a buffering effect so that the pH of a 10% solution is substantially unchanged upon dilution to 1%, the change being of the order of 0.1–0.2 pH units. Thus a 1% extract has practically the same pH as a 10% solution resulting from extraction or extraction and concentration. This is a factor to be considered in making the above-described stock pH determination and also in considering the scope of the present invention and the appended claims.

The acidified gelatin stock is then extracted with water which has been preheated to a temperature within the range of about 120° to 200° F. Although the aforementioned temperature range is suitable for extraction purposes it is preferred to employ temperatures within the range of about 145° to 170° F., since below 145° F. the extraction rate is somewhat too low from a practical standpoint and appreciably above 170° F. difficulty is experienced with degradation of the extracted gelatin.

The selection of the aforementioned pH range of extraction employed in accordance with the process of the present invention is dictated by several factors. To begin with, it has been found that while the use of the lower pH greatly increases the rate of degradation, it also increases the rate of extraction a relatively much greater amount so that a much shorter stock holdup time and water holdup time can be employed. On the average, the gelatin can be completely extracted from the stock in as little as about 4 hours. Furthermore, the extraction of gelatin has been found to be best carried out when the conditions employed result in the provision of a gelatin solution containing between 3 and 6% of gelatin solids. A solution containing more than 6% gelatin solids will not, as a practical matter, serve to remove additional amounts of gelatin from the stock whereas in the case of gelatin solutions containing less than 3% gelatin solids excessive amounts of water must be evaporated. It has been found that using the pH range of 1.5–3.5 for the extraction of the stock, it is possible to provide a solution of the aforementioned optimum concentration using a water holdup time not more than about 2 hours so that a solution of high quality gelatin of greatly increased bloom is obtained. Using extraction pHs appreciably above this range, the favorable extraction rate which is responsible for the provision of the high quality gelatin is not obtained, whereas at pHs appreciably below this range difficulties are encountered in connection with degradation of extracted gelatin or, on the other hand, control of the extraction because of the shortened time permitted for extraction, filtration of the extracted gelatin solution, apparatus design, and the like.

The extracted gelatin solution after separation from the stock is treated in any suitable manner, preferably by the addition of an alkali such as NaOH, KOH, $Na_2CO_3$, $NaHCO_3$, and the like, to raise the pH thereof about 4.0 and neutralize the degrading effect of the acid. In the case of gelatin extracted from pigskin the adjustment of the pH to above 4.0 is adequate but in the case of gelatin solutions extracted from other types of gelatin stock it is preferred that the pH be adjusted to above 5.0. After this adjustment the extracted gelatin solution is filtered using any conventional filtration apparatus such as a plate and frame press and, also, employing a filter aid such as fullers earth, kieselguhr, various diatomaceous earths, and the like. In the case of extracting relatively small pieces of stock it has been found advantageous to adjust the pH of the gelatin solution still further, namely, to a pH of about 7.0–7.5, so that after concentration and a second filtration a clear filtrate will be obtained. Otherwise, difficulty may be experienced in clarifying the concentrated extract.

While the process as heretofore described produces a product having greatly increased bloom and high viscosity, the bloom may be further increased by removal of the salts which are formed in the course of low pH extraction followed by neutralization. The salts may be removed by washing gelatin slabs with water in such a manner that a dialysis takes place, the gelatin gel serving as its own membrane. A commercial dialyser such as the Brosites Web Cell dialyser using a cellophane membrane may be used to remove these salts from a gelatin solution at any desirable point within the process. Various ion exchange resins may also be used to adsorb the salts from a gelatin solution. It is preferred to treat a dilute gelatin solution of about 3 to 6% gelatin solids as provided by the first plate and frame filter press when removing the salts either by means of a commercial dialyser or an ion exchange resin. By washing the solidified or gelled gelatin with water or by employing a commercial dialyser, the salt content of the gelatin may be reduced to whatever level desired depending upon the time of washing and the time of dialysis. These methods, however, are somewhat impractical from a commercial point of view in that they are expensive and require large amounts of space. On the other hand, although the ion exchange material reduces the salt content to a lesser degree, this type of treatment has proved most practical for large scale operation and results in an adequate degree of salt removal for most purposes. It is, therefore, a preferred method.

Instead of neutralizing the acidic gelatin extract by the addition of base as described above, it is also possible to pass the extract through an anion exchange resin to remove directly therefrom a sufficient amount of the acid content to raise the pH to the desired degree in accordance with the considerations discussed above. This offers great advantage in that it is not necessary to employ a base such as caustic or soda ash and, more important, there is no necessity to remove the salts resulting from neutralization with such bases. This results in savings in raw material and processing charges.

The process can be carried out with either concurrent or countercurrent flow of stock or solution in any suitable type of apparatus. For most purposes countercurrent operation is preferred because of decreased difficulties in operating the extracting equipment. Accordingly, the examples set forth hereinafter are directed particularly to countercurrent operation. For purposes of explanation, the accompanying drawings illustrate apparatus suitable for carrying out the countercurrent method of operation, but it is to be understood that any other desired type of apparatus can be employed.

In the accompanying drawings

Figure 2 is a vertical cross section to one type of extractor suitable for use in the process.

Figure 3 is a vertical section through a modified type of extractor that can be employed.

Figure 4 is a top view of the extractor shown in Figure 2.

Figure 5 is a section on the line 5—5 of Figure 2.

Figure 1:
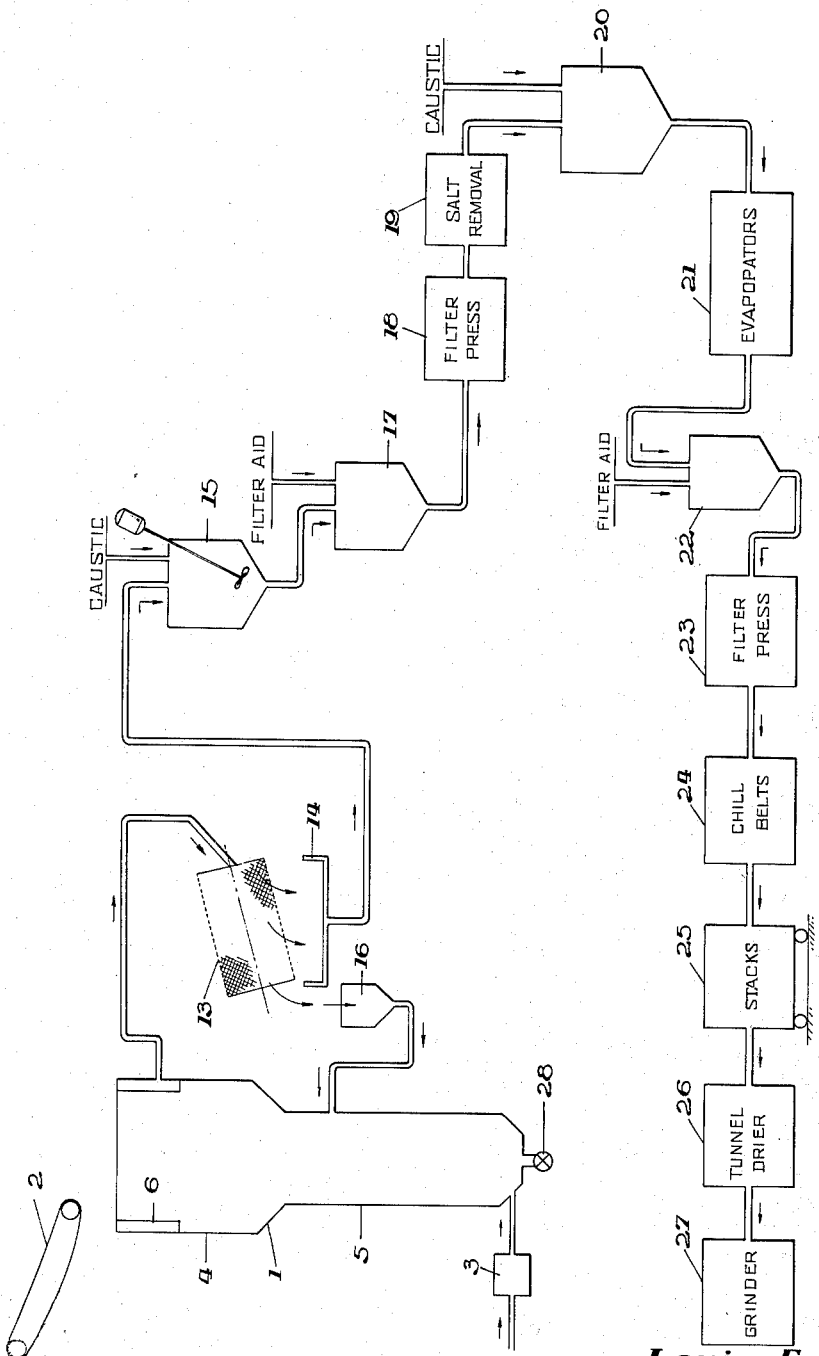
Figure 1 is a flow-sheet representing diagrammatically the entire countercurrent process.

Stock acidified as described above is continuously introduced into the top of extractor 1. Mechanical means such as conveyor 2 may be used. Water from the plant supply with no pretreatment is passed through heat exchanger 3 and brought to 145°–170° F. before being introduced at the bottom of extractor 1. A rotometer or any suitable means may be employed to insure a constant rate of flow.

In order to prevent undue turbulence within the extractor, the top portion 4 is constructed with a larger diameter than the bottom portion 5. Thus, the velocity of the water as it rises in the column will decrease as it reaches the expanded section. It has been found that if no provision is made for a settling section of this nature, excessive turbulence may cause some of the stock fines to pass out of the extractor with the gelatin solution. Also, without the expended section some grease emulsification can occur and cause filtration difficulties. Additionally, as the gelatin stock proceeds downwardly within the extractor, its volume decreases at least 90% as a result of the extraction. Therefore, it is necessary to construct the bottom portion with a diameter such that a water velocity sufficient to effect proper water distribution is insured.

To provide best results, the settling section 4 should encompass about 50% of the total volume of the column and have a cross sectional area of about twice the lower section. It is obvious that the same effect could be achieved using the modification shown in Figure 3. The truncated cone shape allows a more gradual change in the water velocity.

Concentric with a portion of settling section 4 is a screen 6 of about 10 mesh. Near the uppermost portion of screen 6 are takeoff pipes 7. The gelatin stock passes downwardly in the extractor and the gelatin therein is removed by the water passing upwardly through the stock. Nearly spent stock contacts fresh water at the bottom of the extractor, and relatively fresh stock is contacted with gelatin solution near the top of the extractor. As the gelatin solution rises to the top of the column, it must pass through the screen which serves to prevent the stock from passing out with the gelatin solution. The solution at this point has a pH of about 1.5–3.5 and contains about 3–6% gelatin. Regardless of pretreatment all types of gelatin stock retain a certain amount of fatty materials which separate from the stock during extraction and tend to rise to the surface of the liquid in the extractor. For this reason takeoff pipes 7 are located well below the surface of the liquid level within the extractor. Takeoff pipes 7 join manifold 8. Conduit 9 receives the liquor from manifold 8 and rises perpendicularly therefrom. Near the uppermost part of the extractor 1 conduit 9 is directed at right angles with itself. In this manner the liquid level in extractor 1 is maintained above the takeoff pipes 7. Takeoff pipe 10 may be used to remove the fatty materials when desired.

Baffle 11 divides the bottom section of the extractor into four quadrants. Each quadrant has a separate water inlet pipe 12. Channeling is prevented and water distribution is aided in this manner.

The effluent solution is pumped from extractor 1 through conduit 9 to the inside of a rotating cylindrical screen 13 of 60–100 mesh to remove relatively coarse pieces of stock which have been carried out from the extractor. The solution passes through the screen into tank 14 and subsequently to tank 15. The solids which do not pass through the screen are collected in receiver 16 and are recycled into the center of column 1. Caustic soda is continuously added to the solution at tank 15 in order to adjust the pH thereof to approximately 5.5 so as to prevent continuing degradation of the gelatin at the low pH of the extractor. Gentle agitation insures a thorough distribution of the caustic soda. If pigskin stock is used it is sufficient if the pH in tank 15 is adjusted to pH 4. The adjusted solution is then pumped to tank 17 where filter aid is introduced before filtering the solution in filter press 18 so as to remove finer solids that were not removed by the screen 13. The clarified gelatin solution from filter press 18 may be passed through ion exchange resin at 19 for removal of salts which have resulted primarily from the addition of caustic at 15 to the acid solution. When in the case of extracting small pieces of stock it is desired to adjust the pH to 7–7.5 prior to evaporation in order to facilitate clarification of the concentrated gelatin liquor, the gelatin solution is directed from the salt removal treatment at 19 to tank 20 where caustic is added prior to evaporation in evaporator 21. When the step is unnecessary the gelatin solution passes directly from 19 to evaporator 21.

Using the anion exchange resin mentioned hereinabove to raise the pH of the gelatin extract the caustic addition which occurs at 15 can be eliminated, filter aid being added as above at 17, the extract being filtered in the filter press 18, the extract being passed through a bed of anion exchange resin of such a depth and over such a period of time to effect the desired increase in pH so that after deacidification the gelatin extract may be sent to the evaporator 21 and the remainder of the process otherwise carried out as described below.

Tank 22 receives the solution from the evaporator 21 at a concentration of about 20–30% gelatin, and filter aid is added prior to a second filtration in filter press 23 for removal of any solid remaining in the solution. The solution is pumped to chill belts 24 where it is cooled in order to form a gel. The gel is cut into slabs and stacked at 25. The stacks of slabs are dried in a drying tunnel 26 and finally ground to a coarse powder in grinder 27.

As aforementioned, most of the gelatin stock is dissolved but enough remains undissolved so that some purging of the system is necessary. In the case of pigskin a greater proportion of the stock remains undissolved and it is preferred that the purging be carried out continuously. Purging may be carried out by opening drain 28.

The following detailed example illustrates one specific manner in which the operation of the process of the present invention may be carried out:

The extractor 1 having the design shown in Figure 2 and comprising a top portion 4 having a diameter of 4.5 feet and a height of about 6 feet and a bottom portion having a diameter of about 3 feet and a height of about 14 feet was employed. The total volume of the extractor was 200 cubic feet, this volume being equally distributed between the top and bottom portions.

Limed splits are acidified by soaking the same in acid solution at a pH of about 1.0, using about 0.2–0.4 lb. of 20% HCl/lb. of gelatin in the stock, the temperature being within the range of 50°–75° F., the stock being soaked for 4 hours, washed for 3 hours, soaked again for 4 hours and finally washed for an additional 2 hours. The extent of the second acid soaking and washing desired can be determined by removing a small sample of stock and extracting the gelatin with water as aforementioned to determine the effluent pH. In this case the effluent pH is about 1.5 after the second soaking and about 2.0 after the final washing. The stock is then introduced at the top of the extractor 1 using, if desired, the conveyor 2, the rate of addition being 30–50 pounds per minute. As aforementioned, it is preferred that the stock be added at a low temperature of the order of 50°–75° F. Water preheated to a temperature of 145°–170° F. is introduced at the bottom of the column through inlet pipes 12 at the rate of about 10 gallons per minute, a rotometer being used to govern the flow.

The extracted gelatine solution containing between 3–6% gelatin solids is withdrawn at the rate of about 17 gallons per minute from the top of the extractor 1 through conduit 9. The pH of the extracted gelatin solution is within the range of about 1.5–3.5 as aforementioned. It has a temperature of about 110°–120° F. The gelatin solution is then conveyed to rotating cylindrical screen 13 of 60–100 mesh, the solids removed thereby being collected in receiver 16 and recycled into the center of extractor 1 at the rate of about 1 pound per minute. The gelatin solution from the rotating screen 13 in conveyed to tank 15 and, in the case of gelatin extracted from stock other than pigskin, caustic soda is continuously added at the rate of about 20 pounds per hour to provide the neutralization of the acid, raising the pH of the solution to about 5.5 and halting the degradation effect of the acid upon the gelatin. In the case of gelatin solution extracted from pigskin the amount of caustic required is less inasmuch as it is only necessary that the pH of the solution be raised to above 4.0. The neutralized gelatin stock is treated with filter aid in tank 17, filtered in filter press 18 and passed to a column or bed of ion exchange resin of suitable depth at 19 for the removal of salts resulting from the neutralization. The gelatin solution is then conveyed from tank 20 where caustic is added to raise the pH to 7.0–7.5 and thence to evaporator 21 wherein it is concentrated from 3–6% gelatin solids to about 20% gelatin solids. Instead of raising the pH of the gelatin extract by caustic addition, the same may be accomplished by use of anion exchange resin, the extract from 14 going directly to a column or bed of said resin. The pH is thus raised to about 6.0–7.0, filter aid is added, the extract filtered and fed to evaporator 21, there being no addition of base at all. The concentrated gelatin solution is treated with filter aid in tank 22 and filtered using filter press 23. The clarified solution is then pumped to chill belt 24 where it is cooled and gelled, the temperature of the belt being of the order of 33°–39° F.

The length of the belt is about 60 feet. The gelatin is removed from the chill belt and cut in slabs about 5 feet long and 6 inches wide, placed on nets which are stacked and placed in a drying tunnel 26. The temperature of the drier is of the order of 85°–115° F. and after about 20 hours the moisture content of the gelatin solids has been reduced to about 10% after which the solids are ground in a grinder 27 to provide a coarse powder.

The use of the above-described process is capable of consistently providing gelatin having a bloom of about 325.

While the present invention has been described above in connection with specific embodiments and details of operation, it will be understood that the invention is not to be construed as limited thereby but rather that its scope is to be determined solely by reference to the appended claims. While the invention has been described with particular reference to gelatin stock and the extraction of gelatin therefrom, it will be understood that it is equally applicable to glue stock and to the extraction of glue therefrom.

The present application is a continuation-in-part of our copending application U. S. Serial #231,034, now abandoned.

What is claimed is:

1. The method of extracting gelatin from gelatin stock comprising soaking the stock in strong acid prior to extraction at a temperature below extraction temperatures, passing the acid soaked stock and hot water through an extraction zone while circulating the water through the stock to dissolve the gelatin from the stock and form an aqueous gelatin solution, the amount of acid in the soaked stock when introduced into said extraction zone providing a pH of the effluent gelatin solution from said zone within the range of about 1.5–3.5, and adjusting the pH of the effluent solution to within the range of about 4.0–8.0 to neutralize the degrading effect of the acid.

2. The method of claim 1 in which the temperature of the extracting water is within the range of about 145° to 170° F.

3. The method of claim 1 in which the pH of the effluent gelatin solution is adjusted to a pH within the range of about 5.0 to 8.0 by passing said solution through a bed of anion exchange resin.

4. The method of claim 1 in which the water and gelatin stock within the extraction zone are circulated counter-currently.

5. The method of claim 1 in which the water circulates through the stock in the extraction zone at a rate sufficient that the water hold-up time in said zone is not more than about two hours.

6. The method of extracting gelatin from gelatin stock comprising soaking the stock in strong acid prior to extraction at a temperature below extraction temperatures, passing the acid-soaked stock and water heated to a temperature within the range of about 145°–170° F. through an extraction zone and counter-currently with respect to each other, the amount of acid in the soaked stock when introduced into said extraction zone providing a pH of the effluent gelatin solution from said zone within the range of about 1.5–3.5, the water being circulated at a rate sufficient that the water hold-up time in said extraction zone is not more than about two hours, adjusting the pH of the effluent to a pH within the range of about 5.0–8.0 by passing said effluent through a bed of anion exchange resin.

References Cited in the file of this patent

UNITED STATES PATENTS

| Number | Name | Date |
|---|---|---|
| 61,371 | Wells | Jan. 22, 1867 |
| 1,911,205 | Richardson | May 30, 1933 |
| 2,024,683 | Epstein et al. | Dec. 17, 1935 |
| 2,048,728 | Christopher | July 28, 1936 |
| 2,240,116 | Holmes | Apr. 29, 1941 |
| 2,368,393 | Zeigler | Jan. 30, 1945 |
| 2,460,809 | Damschroder et al. | Feb. 8, 1949 |
| 2,560,011 | Trudel | July 10, 1951 |
| 2,575,551 | Frechin | Nov. 20, 1951 |
| 2,648,659 | Spence et al. | Aug. 11, 1953 |

FOREIGN PATENTS

| Number | Country | Date |
|---|---|---|
| 540,369 | Great Britain | Oct. 15, 1941 |